United States Patent
Anvin et al.

(10) Patent No.: US 7,725,677 B1
(45) Date of Patent: *May 25, 2010

(54) METHOD AND APPARATUS FOR IMPROVING SEGMENTED MEMORY ADDRESSING

(76) Inventors: H. Peter Anvin, 4390 Albany Dr., San Jose, CA (US) 95129; Alex Klaiber, 231 Sierra Vista Ave., Mountain View, CA (US) 94043; Guillermo J. Rozas, 104 Magneson Ter., Los Gatos, CA (US) 95032; Parag Gupta, 909 Del Avion La., San Jose, CA (US) 95138

( * ) Notice: Subject to any disclaimer, the term of this patent is extended or adjusted under 35 U.S.C. 154(b) by 16 days.

This patent is subject to a terminal disclaimer.

(21) Appl. No.: 12/033,784

(22) Filed: Feb. 19, 2008

Related U.S. Application Data

(63) Continuation of application No. 11/026,623, filed on Dec. 30, 2004, now Pat. No. 7,334,109, which is a continuation of application No. 09/930,625, filed on Aug. 15, 2001, now Pat. No. 6,851,040.

(51) Int. Cl.
*G06F 12/00* (2006.01)
(52) U.S. Cl. .................. 711/220; 711/206; 711/208; 711/209
(58) Field of Classification Search .............. 711/206, 711/208, 209, 220
See application file for complete search history.

(56) References Cited

U.S. PATENT DOCUMENTS

| | | | |
|---|---|---|---|
| 5,596,735 A | 1/1997 | Hervin et al. | |
| 5,734,858 A | 3/1998 | Patrick et al. | |
| 5,768,593 A | 6/1998 | Walters et al. | |
| 5,787,495 A | 7/1998 | Henry et al. | |
| 5,809,522 A | 9/1998 | Novak et al. | |
| 5,864,877 A | 1/1999 | Henry et al. | |
| 6,298,411 B1 | 10/2001 | Giacalone | |
| 6,349,380 B1 | 2/2002 | Shahidzadeh et al. | |
| 6,430,674 B1 | 8/2002 | Trivedi et al. | |
| 6,457,115 B1 | 9/2002 | McGrath | |
| 6,463,517 B1 | 10/2002 | McGrath | |
| 6,470,492 B2 | 10/2002 | Bala et al. | |
| 7,124,286 B2 | 10/2006 | McGrath et al. | |

OTHER PUBLICATIONS

USPTO Non-Final Office Action Mailed Jul. 7, 2003; 09930625.
USPTO Non-Final Office Action Mailed Mar. 24, 2004; 09930625.
USPTO Notice of Allowance Mailed Sep. 20, 2004; 09930625.
USPTO Non-Final Office Action Mailed Mar. 22, 2007; 11026623.
USPTO Notice of Allowance Mailed Sep. 28, 2007; 11026623.
USPTO Notice of Allowance Mailed Nov. 28, 2007; 11026623.

*Primary Examiner*—Christian P Chace
*Assistant Examiner*—Mehdi Namazi

(57) ABSTRACT

A method and apparatus for breaking complex X86 segment operations and segmented memory addressing into explicit sub-operations so that they may be exposed to compiler or translator-based optimizations.

20 Claims, 5 Drawing Sheets

| AGENSL | destReg | altAdd | SELECT |

| AGENSG | desrReg | altAdd | Se |

| SEGCKX | segNum | OFFSET | ACCSIZE |

FIGURE 4

METHOD AND APPARATUS FOR IMPROVING SEGMENTED MEMORY ADDRESSING

CROSS-REFERENCE TO RELATED APPLICATIONS

This patent application is a continuation of and claims the benefit of U.S. patent application Ser. No. 11/026,623 entitled "Method and Apparatus for Improving Segmented Memory Addressing", by Anvin et al., filed on Dec. 30, 2004, now U.S. Pat. No. 7,334,109, which is a continuation of U.S. patent application Ser. No. 09/930,625 entitled "Method and Apparatus for Improving Segmented Memory Addressing", by Anvin et al., filed on Aug. 15, 2001, now U.S. Pat. No. 6,851,040, which are hereby incorporated by reference.

BACKGROUND OF THE INVENTION

1. Field of the Invention

This invention relates to computers and, more particularly, to a methods and apparatus for increasing the speed of access of segmented memory.

2. History of the Prior Art

Modern general purpose computers are typically designed to manipulate large amounts of data under control of a large number of application programs. To accomplish this, both the application programs and a large portion of the data are stored in some form of memory which may be viewed as a part of the computer. This memory includes main memory which is typically some form of random access memory that the processor accesses to execute the instructions of each application program; various caches which provide faster access for the processor to instructions and data that typically have been more recently used; and longer term memory such as hard drives, floppy disks, and other devices typically associated with the processor by way of an input/output bus.

Any of these different forms of memory may store the instructions and data which are necessary to execute an application program. However, each of these individual parts of memory is a different structure usually physically separated from the other parts which make up the storage system of the computer. At some times, a particular piece of data or an instruction may reside in any one or more of these parts. Where the data or instruction resides is typically controlled by a memory control portion (unit) of the computer. The memory control unit decides where the information should be stored depending on whether the information is currently being manipulated by a program, the size of the various parts of the storage system, and other factors. In order to access data and instructions, a processor uses an address which is unique to the physical position at which the data or instruction is stored in each part. This is referred to as a physical address.

Since the storage systems of individual computers vary in type and size and since both data and instructions may be stored at various physical addresses at different times while a program is being executed by a single computer, a programmer does not know when writing a program where any element of data or any instruction will be stored in any computer that is to execute the program. As a consequence, a programmer and the compiler software use what are referred to as logical addresses in designating storage addresses for elements of the various operations that are being programmed. These logical addresses must then be translated into physical addresses by the memory control unit of each computer in order to access the data and instructions in the parts of the storage system of a computer as the program is being executed.

Various computers accomplish address translation in different ways. Computers designed to run more advanced operating systems such as Unix utilize what is often referred to as a flat system of addressing for memory. A flat memory system essentially starts at address zero and runs sequentially to an end address. Usually, the memory storage which is addressable is larger than main memory so that the physical addresses of main memory usually only take up some limited portion of the addresses of the storage system. The memory control unit controls the information that is to reside in main memory through a memory control system called paging.

Main memory may be logically divided into fixed-sized portions referred to as pages. When a computer running such a system begins operating, it places those system processes necessary to control computer operations in main memory at predetermined addresses. When a particular application program is started, the memory controller determines the addresses of the instructions of that program necessary to operate the program at a starting level and copies page-sized portions of those instructions into portions of main memory not in use by the operating system. As more data and instructions are required to execute the application program, the memory control unit copies the additional information from long term memory to main memory in page-sized portions. The determination of memory address is made through the use of page tables which are stored in main memory as part of the operating system. These page tables respond to a logical look-up address by providing a physical address at which a page in which the data and instructions are actually stored. The page table entries which provide physical addresses also furnish the various properties of the pages such as whether. They are readable and writable, and the level of priority necessary for an access among other things. Sometimes information already in main memory must be removed to provide space for new pages of information being copied from long term memory. In such a case, the memory controller makes sure that any newly-changed information being removed from main memory is updated in long term memory before it is removed.

The process of determining a physical address from a logical address is relatively easy for a processor to accomplish rapidly with a flat memory system because the manipulations necessary to the address conversion are so simple.

On the other hand, by far the largest number of computers in existence allow the use of a different type of memory control. These computers are based on the X86 family of computers designed and built by (amongst others) Intel Corporation of Santa Clara, Calif. The original X86 processors were quite simple and designed to make use of a very small amount of memory storage. All of that storage was in main memory. The operating system and any application program to be executed were loaded to main memory from floppy disks and then run from main memory.

A complicating factor of early X86 machines was the need to keep different parts of the information necessary to a program isolated from other parts during operation so that data and instructions would not be corrupted. This required that some form of priority system be adopted which would allow different portions of main memory to be isolated from one another. The system used, called segmentation, was largely derived from the segmentation scheme used by the computers running the Multics operating system from Honeywell Corporation. The segmentation system continues today with legacy code written for certain operating systems such as Microsoft Windows 3.1 and its successor systems.

With segmentation, different portions of main memory can be designated as segments having different properties. Thus segments can be assigned for data, for instructions, and for stacks. Different segments can be made accessible only by the system, by the system and application programs, and so on. The different segments can be made read-only, read/write, and given other properties. By placing different types of information in different segments, interference can be reduced.

In order to make this system work, segments are assigned physical addresses beginning at some offset from the start of main memory and continuing for some predetermined length. Then, a memory address for information stored in a segment includes another offset from the beginning of the particular segment to the position at which the addressed information is stored.

The use of segmentation in the memory design of early X86 processors designed by Intel and others required that logical addresses be translated into the physical addresses assigned by a memory controller implementing the segmentation system. This required the memory controller to keep track of where each segment began and the length of the segment in order to enable such a translation. The same requirement continues for legacy code written to utilize the segmentation process.

The memory controller utilizes a series of descriptors stored in tables, a global descriptor table and one or more local descriptor tables. Each such descriptor table is itself a segment with a beginning (base address), a length, and properties. The descriptors in each table indicate where the related segment begins in memory, its length, and its properties. A descriptor is accessed and stored in one of a limited number of descriptor registers so that the segment information is available for use by a processor for address translation.

To utilize this information to access memory, the logical addresses provided in the X86 system includes a reference to the segment in which the information is stored and an offset into the segment. A typical instruction is assumed to refer to a segment; for example, an access of data is assumed to be to the standard data segment stored in the DS descriptor register. A reference to a segment having a descriptor already stored in a descriptor register allows an immediate access to the base using the beginning and length information once a properties check has been done. Additional sets of descriptor registers are provided which can be explicitly selected by the referencing instruction.

In most cases, before a descriptor can be used for a memory reference, it needs to be loaded into a segment descriptor register. A segment descriptor to be loaded into a segment register is identified by a segment selector which can be determined from an explicit instruction to index into one of the descriptor tables to access a descriptor. A segment selector includes an indication which of two descriptor tables is to be used for deriving a descriptor; it also includes an index into the designated table and a priority level for the addressed memory. The descriptor found indicates where a segment begins and ends and its characteristics.

In earlier versions of the Microsoft Windows desktop operating system, segmentation was used to overcome the limited address space available on early X86 processor implementations. Ultimately, it was found necessary to implement paging in order to make the system viable for applications of larger sizes (which were easily digested by its processor competitors). When paging was added, the segmentation system was maintained so that legacy software could run on the more modern X86 systems.

Keeping the segmentation memory system requires that two address translations be done when paging is enabled. First, segmentation cannot be disabled so logical addresses assigned in an application program have to be translated to "linear addresses" using the segmentation system. In prior art systems, this translation is accomplished by processor hardware through a relatively complicated set of steps that are an integral part of each individual memory reference. Then once the segmentation process has completed, the linear addresses are translated to physical addresses. This makes the process of memory addressing a very tedious one in modern X86 systems.

Furthermore, the act of loading a segment descriptor from memory into a segment register (which needs to be done prior to using that descriptor) is itself complicated, involving using a segment selector to determine a descriptor table to be utilized, indexing into the table determined to derive a segment descriptor, determining from the selector whether the properties of the access match the properties of the descriptor derived, and finally placing the descriptor into the desired segment register.

The X86 architecture has two fundamental segmentation-related operations: ordinary (segmented) memory references that use a segment descriptor already loaded into the processor, and instructions to load a segment descriptor into the processor.

In prior art X86 implementations, loading a segment descriptor is carried out by a single complex instruction. Likewise, all memory references always include the steps of checking the limit and permission of the accessed segment, and adding the segment base address to the logical address in order to form a linear address.

In practice, not all of these steps are always needed. For example, many modern operating systems use primarily a "flat" address model, where the base address of most segments is zero. Adding a base address is unnecessary in this case, yet the hardware to perform the base add still consumes power, complicates the hardware design, and contributes to the cycle time of what is likely a critical path in the processor.

Likewise, a given sequence of X86 instructions may contain several memory references to the same segment. Even barring any a priori knowledge about that segment's properties, it is in principle sufficient to check the segment's access permissions once, rather than redundantly for each memory reference in the sequence.

Thus, a problem faced by modern X86 systems utilizing segmentation is that the number of steps required for the segmentation based addressing and loading operation are numerous and slow the operation of the computer significantly. It is therefore desirable to provide improved methods and apparatus for accelerating the segmentation-based addressing process in an X86-based computer.

SUMMARY OF THE INVENTION

The present invention is realized by a method for implementing a segmentation addressing operation by providing a first logical address and a segment, deriving a linear address from the logical address and the segment in a first discrete sub-step in which the properties of a logical address are checked to determine whether those properties are consistent with the criteria for addressing the segment, and a second discrete sub-step of performing a base add operation to determine the linear address.

In an embodiment of the invention, the derivation of a linear address of a segment descriptor is divided into a first discrete sub-step in which the properties of a segment selector are first checked to determine whether those properties are consistent with the criteria for addressing a first descriptor table, and a second discrete sub-step of performing a base add operation to determine a linear address.

Dividing the derivation of segmented addresses into a series of individual discrete sub-steps allows those sub-steps to be scheduled and optimized by a compiler, and even completely eliminated in many instances in which prior art arrangements are forced to carry out a complete accessing operation.

These and other features of the invention will be better understood by reference to the detailed description which follows taken together with the drawings in which like elements are referred to by like designations throughout the several views.

BRIEF DESCRIPTION OF THE DRAWINGS

FIG. 4 is diagram illustrating new instructions utilized in implementing the present invention.

DETAILED DESCRIPTION

Figure 1:
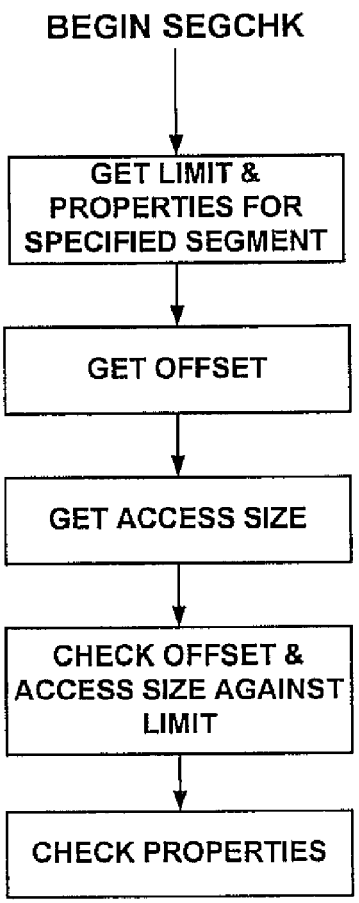
FIG. 1 is a flow chart illustrating a method in accordance with the present invention.

As described above, in prior art X86 systems, the segmentation addressing process has been accomplished in response to a single instruction the steps of which are inevitably carried out each time a logical address is presented. The process is very expensive.

By breaking up some of the segment-related operations into their respective sub-operations, it is possible to expose these sub-operations to compiler optimization, and eliminate redundant or unnecessary operations. This approach relies on a trusted compiler (or other translation or code generation system) to insert enough checks to maintain the original X86 segmentation semantics, especially the segment protections. It is especially useful with a processor such as the Crusoe™ processor designed by Transmeta Corporation of Santa Clara, Calif. which performs the trusted translation dynamically and in software. However, the spirit of the present invention is equally applicable to systems where translation or code generation is performed statically, or in hardware.

The various properties of a flat memory system allow improvements to be made in the process of accessing memory. In a flat memory system, the number of steps needed for implementing a memory access even when segmentation is functioning may be significantly reduced. For example, if a segment uses the entire memory available, then the usual segment checks for segment size may be eliminated. Furthermore, if a flat segment is (in general) both readable and writable, the other checks typical to a memory access are also unnecessary. Moreover, with segment base addresses being zero in a flat system, no base add step is required.

With prior art hardware implementations of the memory access process, it has been impossible to make use of the ability to eliminate portions of the segmentation process. However, the present invention presents a method and apparatus by which both the processes of (segmented) memory access and segment descriptor loading may be accelerated.

As a part of the implementation of the present invention, the single instruction utilized by prior art hardware implementations for accomplishing a (segmented) memory access is separated into three individual parts, a segment check operation (implemented by a SEGCK instruction), a base add operation (implemented by one or more general mathematical instructions), and a traditional RISC-processor style (non-segmented) memory access. In other words, the sub-operations of segment size and permissions checking, and segment base addition, which in prior art X86 systems are an integral part of a memory access instruction, have been split off into individual instructions that can execute in the processor's general arithmetic (rather than memory) unit(s).

The segment check instruction (which appears in a number of forms depending on the particular segment and type of access involved) carries out the various checks which are required for that particular segment and type of access. These checks include permission checks which determine that the type of access is allowed, and that the access attempted is allowed by the segment properties; and a limit check which determines that the access is within the segment limits. The base add operation simply performs the arithmetic to add the offset to the segment base. All sub-operations are available for compiler optimizations, including but not limited to common subexpression elimination, loop invariant removal, and strength reduction. Furthermore, in a system that allows recovery from out-of-order or overly conservative exceptions, segment checking can be further optimized by replacing multiple checks for individual accesses to the same segment but at different offsets relative to a given base register with a single check for an access that encompasses all offsets and sizes of the individual accesses. For example, three memory references of four bytes each at offsets 4, 8, and 12 relative to the stack pointer can be checked by a single SEG-CHK of 12 bytes at offset 4 relative to the stack pointer.

If it is known a priori that the segment being accessed includes all of memory, that the segment is (in general) both readable and writable, and that the priority level of the access is sufficient, then the steps of the segment check can be eliminated. If it is known that the base of the segment is zero, then the individual steps of the base add operation can be eliminated. In order to allow elimination of these steps, provision is made for storing context from which the present operating state of the processor may be determined. A special context register is provided in which is stored, for each of a number of segment registers, information referred to as "base zero" and information referred to as "friendly." In one embodiment, each of the base zero and friendly information requires a single bit in the register.

In a first condition, the base zero information for a given segment register indicates that the segment being held in that segment register has a segment base of zero. In a second condition, the base zero information indicates that the segment does not have a base address of zero.

In a first condition, the friendly information for a given segment register indicates that the segment held in that segment register can be both read and written (or else is a code segment and can be read; code segments are usually not writable in the X86 architecture), that the segment is "grow up," and that it is present and unlimited. In a second condition, the friendly information indicates that the segment does not have these attributes.

Figure 5:
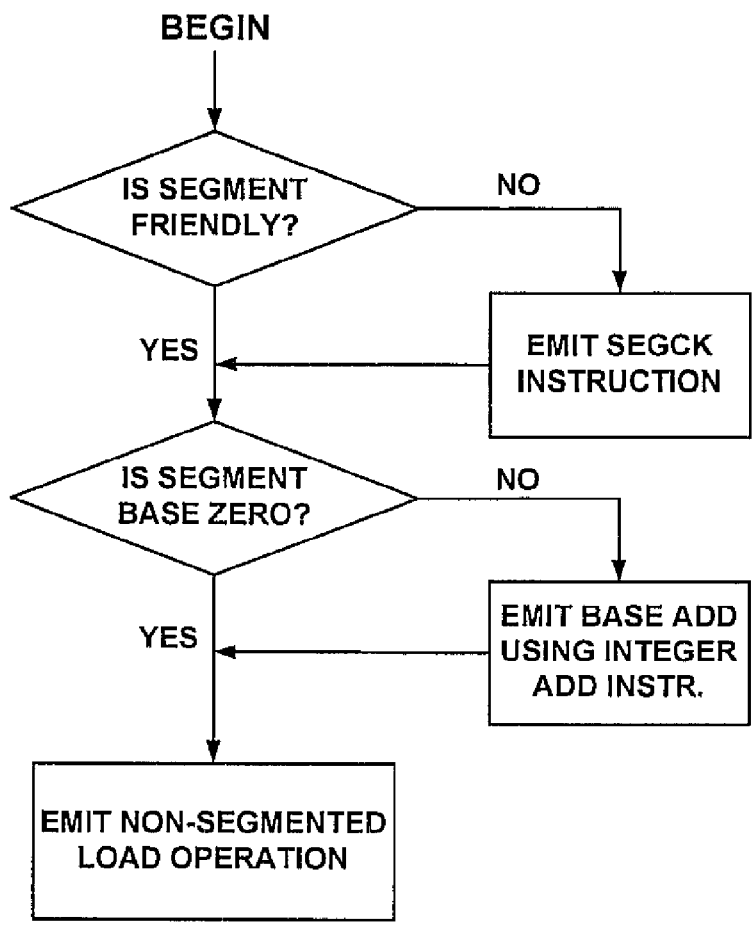
FIG. 5 is a flow chart illustrating operation of a compiler in accordance with the present invention.

Therefore, when generating code to be run in a specific processor context (see FIG. 5), a test of the context "base zero" and "friendly" indicators determines whether the individual operations necessary for a (segmented) memory access can be eliminated. Using this context information, the compiler can immediately eliminate redundant or unnecessary base add and segment check operations, as described above.

Since the prior art method of carrying out a memory access in hardware requires that each of the permission checking and base add steps be accomplished whenever any access is attempted, the ability provided by the invention to eliminate these steps drastically reduces the time required for executing code in systems which utilize segmentation processes in addressing memory.

It should be noted that the effect of a SEGCHK instruction could be emulated by a sequence of traditional RISC-style compare and branch instructions. However, by providing segment check instructions in hardware, the present invention allows the cost of segment limit and access checking to be drastically reduced in comparison. And unlike the prior art hardware process which requires that all of the steps of segment checking and base addition be carried out without fail, the present commands allow each individual portion of the process to be optimized and even entirely eliminated.

Again, other embodiments may choose to aggregate different sub-steps into a single operation, e.g., they could provide an instruction that performs the work of both a SEGCHK and base-add in one step. Another embodiment might combine the base-add and (non-segmented) memory access into one instruction.

Finally, it is possible for an embodiment to use the "friendly" and "basezero" information to dynamically suppress segment checks and/or segment base additions in hardware and thus save power or accelerate processor operation. (This is in contrast to the methods discussed above, which statically omit redundant operations, by not generating instructions for them in the first place.)

Another complex X86 operation related to segmentation is the loading of a segment descriptor into a segment register. That operation consists of the following steps: given a segment selector, decide which of two tables contains the segment descriptor identified by the selector; compare the selector against the limit of the chosen table segment, raising an exception if necessary; check the access permissions to the selected table segment, raising an exception if necessary; compute the linear address of the descriptor in the chosen table; load the descriptor from memory; and parse the descriptor and store it (and/or information derived from the descriptor) in a specified segment register.

As described above, since the process of providing a new segment which may be accessed in itself requires an access of a discrete segment in memory (i.e., a descriptor table), the new commands described above can be used to accelerate the segmentation process. However, an additional improvement allows the process to be even further accelerated.

This additional improvement relates to the provision of another new instruction, an address generation instruction called AGENS. The new address generation instruction, like the other new instructions, provides a hardware implementation of a process which otherwise is quite time consuming.

As described above, in prior art X86 systems, the process of loading a segment descriptor into a segment register has been accomplished by accessing a memory address in a descriptor table which is stored in its own individual memory segment to derive a descriptor defining a newly-accessible memory segment. Typically, the process is accomplished by a single instruction the steps of which are carried out in hardware. Although the particular instruction may vary, the instruction carries out the individual steps by using a segment selector to determine a descriptor table to be utilized, indexing into the table determined to derive a segment descriptor, determining from the selector whether the properties of the access match the properties of the descriptor derived, loading the raw descriptor from memory, and finally placing the descriptor (and/or derived information in a segmentation register of the descriptor cache).

To accomplish this in software, the lookup code has to be conditioned on the table in which the descriptor is found. So the process has to look at the selector for the table indicator, compare that indicator with two possibilities to see which table is involved, and then branch to the one of two sets of code for the particular table, and execute the particular code selected.

To facilitate scheduling and software-pipelining of segment descriptor loading operations, we introduce two new instructions, AGENS and WRSEG The address generation instruction computes the address of a descriptor in a descriptor table, given a segment selector. As has been described above, a segment selector in X86 processors is used to derive a descriptor which provides a segment address and properties. A selector includes information regarding the particular descriptor table to be used, an offset into the descriptor table, and a highest priority level to be used for accesses to the segment. However, the selector may not be available in the pipeline soon enough to allow its contents to be used in the manner described above without stalling the pipeline.

The AGENS instruction accomplishes the segment check for a descriptor table and does the base add to obtain the descriptor address. However, the segment check for a descriptor segment may be less precise than that for a normal memory access since a descriptor table never contains more than 64K bytes, is always "grow up" in nature, and is always accessed in aligned 8-byte quanta.

Figure 2A:
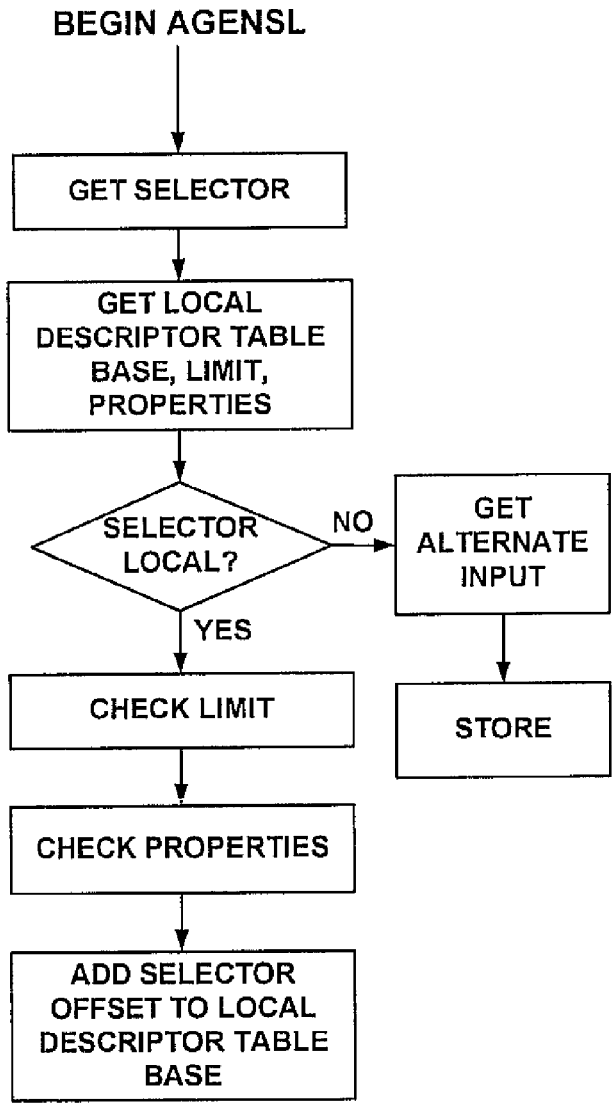
FIGS. 2A and 2B are flow charts illustrating another method in accordance with the present invention.
Figure 2B:
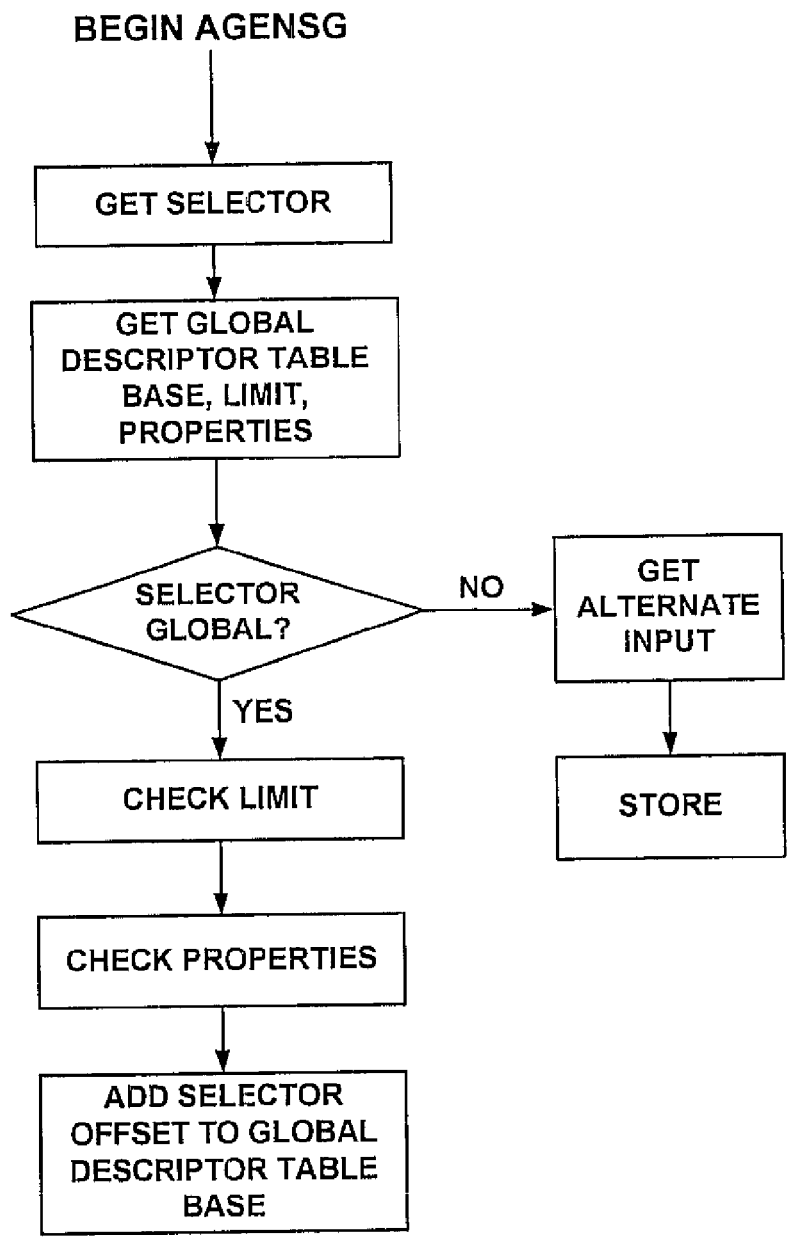

The AGENS instruction is actually one of a pair of instructions illustrated in FIG. 4, one for addressing a local descriptor table and another for addressing the global descriptor table. Each of these instructions takes a selector from a general purpose source register as input. Each instruction also has an alternate input which is an alternate input. As may be seen in FIG. 2, an AGENS instruction takes the selector value and checks the table indicator. If the indicator is for the table being accessed by the particular AGENS instruction (i.e., local or global), then the selector is used to compute the address of the descriptor by adding the selector offset to the base address of the table, and checking the selector against the size and access permissions of the table. If the checks indicate a violation, an exception is signaled. Otherwise, the descriptor address is then placed in a destination register for accessing the segment. If the indicator is not for the table being accessed by the particular AGENS instruction, the results of the first attempt to execute the instruction (including any exceptions) are suppressed; and the alternate input is placed in the destination register.

For example, if the AGENSG (global) instruction is executed, and the table indicator of the selector is for the global descriptor table, then the selector offset is added to the global descriptor table base found in the global descriptor table register (FIG. 3) to provide the descriptor address for the destination register. However, if the table indicator of the selector is for the local descriptor table, then the alternate input is returned in the destination register.

The AGENSL (local) instruction functions in a similar manner to return (in the destination register) either a descriptor address in the local descriptor table if the table indicator reads local or the alternate input of the instruction if the indicator reads global.

Thus, after executing both the local and global AGENS instructions, with the alternate input of the second AGENS instruction being fed the output of the first AGENS instruction, either an exception has been raised (indicating that the selector specified an illegal value), or the destination register (dest) holds the linear address of the descriptor specified by the segment selector.

If it can be statically determined which table will be accessed, one of the AGENS instructions can be eliminated.

At this point, a (non-segmented) load instruction can be used to load the raw descriptor from memory, at the linear address computed by the preceding AGENS instructions.

The use of the AGENS instructions provides for very rapid generation of descriptor addresses so that the addresses are available well within the time limits set by the system pipeline.

A final instruction, WRSEG, moves the thus loaded segment descriptor (and/or information derived from the descriptor) into a specified segment register. Concurrently, the WRSEG instruction also examines the raw descriptor and determines whether the segment's base address (as specified in the segment descriptor) is zero, and whether the segment is "friendly". That information is then used to update the processor's above-mentioned context register.

Again it is to be noted that the current invention relies on a trusted compiler to synthesize the X86 segment descriptor operation from the available sub-operations (which in this embodiment include AGENS and WRSEG instructions), and to insert enough checks to maintain the original X86 semantics.

Finally, note that different embodiments of the current invention may choose to aggregate different sets of sub-operations of segment loading into a single instruction. For example, the functions of AGENS and subsequent load from the computed linear address might be combined into one instruction. Yet another embodiment might combine the load from memory with the WRSEG operation.

Figure 3:
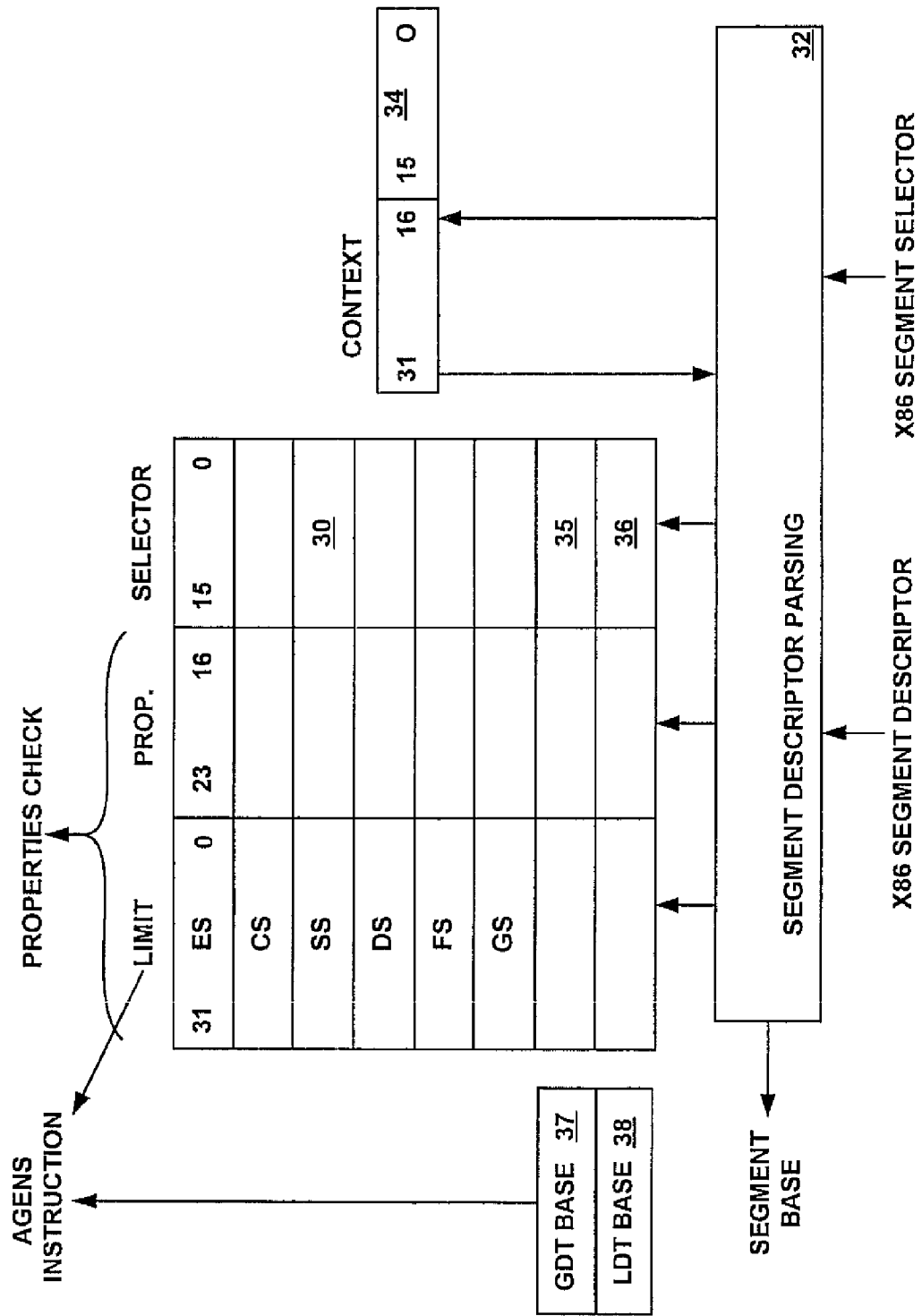
FIG. 3 is a block diagram of circuitry designed in accordance with the present invention.

FIG. 3 illustrates in block form circuitry utilized in one embodiment of the invention. The circuitry includes what is often referred to as a descriptor cache 30 including registers ES, CS, SS, DS, FS, and GS for storing segment descriptor values. In the particular embodiment, each entry includes a 16-bit segment selector, an 8-bit property indicators, and a 32-bit limit value. In this embodiment, the base values of each segment descriptor are held in general purpose registers (not shown) under software control.

The descriptor values held in the registers of the descriptor cache are furnished as a result of a segment descriptor parsing operation whether software or hardware (shown as block 32). The manner in which the parsing operations are carried out is well known to those skilled in the art.

As may be seen, the parsing of the descriptor values is affected by the context in which the processor is operating, and in turn affects the context. Context values are stored in a context register 34 and provide input to the parsing operation. The results of parsing also often affect the context of the processor operation and changes may be effected by input to the context register 34 from the parsing operation.

In addition to the descriptor registers already described, an additional pair of registers are included in the descriptor cache 30. These are a register 35 which stores the segment selector, property indicators, and limit value for the global descriptor table: and a register 36 which stores similar values for a local descriptor table. Moreover, two additional registers 37 and 38 are provided which receive the base values for the global descriptor table and the local descriptor table, respectively.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method comprising:
    accessing stored context of present operating state of a processor to determine if a segment check operation can be eliminated when executing a memory access;
    accessing said stored context to determine whether a base add operation can be eliminated when executing said memory access; and
    issuing a base add instruction if said stored context does not indicate said base add operation can be eliminated when executing said memory access, wherein said base add instruction initiates said base add operation to generate a linear address for said memory address.

2. The method of claim 1, further comprising:
    determining during execution of said memory access that said base add operation can be eliminated.

3. The method of claim 2, further comprising:
    in response to said determining during execution, suppressing execution of said base add operation.

4. The method of claim 2, wherein said determining during execution is based on said stored context.

5. The method of claim 1, further comprising:
    issuing a segment check instruction if said stored context does not indicate said segment check operation can be eliminated when executing said memory access, wherein said segment check instruction initiates said segment check operation; and
    determining during execution of said memory access that said segment check operation can be eliminated.

6. The method of claim 5, wherein said determining during execution is based on said stored context.

7. The method of claim 1, wherein said stored context is stored by a register.

8. The method of claim 2, further comprising:
    eliminating said base add operation.

9. The method of claim 8, wherein a compiler performs said eliminating said base add operation.

10. The method of claim 5, further comprising:
    eliminating said segment check operation.

11. The method of claim 10, wherein a compiler performs said eliminating said segment check operation.

12. A method comprising:
    issuing a sequence of instructions comprising memory accesses, said issuing the sequence of instructions comprising:
        issuing base add instructions that initiate base add operations to generate linear addresses for respective ones of said memory accesses; and
    performing an optimizing operation on said sequence of instructions, said performing comprises accessing stored context of present operating state of a processor.

13. The method of claim 12, further comprising:
    issuing segment check instructions that initiate segment check operations for respective ones of said memory accesses.

14. The method of claim 13, wherein said performing the optimizing operation comprises eliminating at least one of said segment check instructions.

15. The method of claim 14, wherein said performing the optimizing operation comprises eliminating at least one of said base add instructions.

16. The method of claim 12, wherein said performing the optimizing operation comprises eliminating at least one of said base add instructions.

17. The method of claim 13, wherein said performing the optimizing operation comprises eliminating at least one of said base add instructions.

18. The method of claim 14, wherein said eliminating at least one of said segment check instructions is performed by a compiler.

19. The method of claim 15, wherein said eliminating at least one of said base add instructions is performed by a compiler.

20. The method of claim 12, wherein said stored context is stored by a register.

\* \* \* \* \*